(12) United States Patent
Ashline

(10) Patent No.: US 6,499,149 B2
(45) Date of Patent: Dec. 31, 2002

(54) RACE CAR DRIVER HELMET/HEAD RESTRAINT

(75) Inventor: Trevor P. Ashline, Rock Hill, SC (US)

(73) Assignee: Safety Solution, Inc., Concord, NC (US)

( * ) Notice: Subject to any disclaimer, the term of this patent is extended or adjusted under 35 U.S.C. 154(b) by 0 days.

(21) Appl. No.: 09/993,839

(22) Filed: Nov. 16, 2001

(65) Prior Publication Data

US 2002/0178492 A1 Dec. 5, 2002

Related U.S. Application Data

(63) Continuation-in-part of application No. 09/837,215, filed on Apr. 19, 2001, now abandoned.

(51) Int. Cl.$^7$ ................................................. A42B 3/00
(52) U.S. Cl. ....................... 2/468; 2/411; 2/421; 2/425; 280/290; 297/464; 297/465
(58) Field of Search ............................ 2/468, 102, 411, 2/69, 421, 6.2, 416, 425; 280/290, 748, 801.1; 297/464, 465, 393, 216.12; 244/122 AG; 182/3

(56) References Cited

U.S. PATENT DOCUMENTS

| | | | | |
|---|---|---|---|---|
| 602,609 A | * | 4/1898 | Tatro | 280/230 |
| 3,524,679 A | * | 4/1970 | De Lavenne | 24/650 |
| 3,514,784 A | | 6/1970 | McDavid | 2/2 |
| 3,671,974 A | * | 6/1972 | Sims | 2/421 |
| 3,925,822 A | * | 12/1975 | Sawyer | 2/421 |
| 4,570,974 A | * | 2/1986 | Dove | 280/801.1 |
| 4,638,510 A | | 1/1987 | Hubbard | 2/6 |
| 4,731,882 A | * | 3/1988 | Ekman | 2/69 |
| 4,909,459 A | | 3/1990 | Patterson | 244/133 AG |
| 4,923,147 A | | 5/1990 | Adams | 244/122 AG |
| 5,080,191 A | * | 1/1992 | Sanchez | 182/3 |
| 5,267,708 A | | 12/1993 | Monson | 244/122 AG |
| 5,272,770 A | | 12/1993 | Allen | 2/2 |
| 5,437,613 A | * | 8/1995 | Reggio et al. | 2/425 |
| 5,715,541 A | | 2/1998 | Landau | 2/425 |
| 5,738,046 A | * | 4/1998 | Williams et al. | 119/770 |
| 6,006,860 A | * | 12/1999 | Bell | 182/18 |
| 6,009,566 A | | 1/2000 | Hubbard | 2/468 |
| 6,330,722 B1 | | 12/2001 | Betts | 2/416 |
| 2001/0002087 A | * | 8/1998 | Townsend | 280/801.1 |

FOREIGN PATENT DOCUMENTS

WO 93/05986 * 4/1993

* cited by examiner

Primary Examiner—Rodney M. Lindsey
(74) Attorney, Agent, or Firm—Dougherty & Clements LLP

(57) ABSTRACT

A head and neck restraint device, worn by a driver when operating a high performance vehicle, which controls the driver's head from snapping forward and maintains the driver's head, neck and spine in general alignment in the event of a frontal crash. The device includes a pair of anchor straps that are worn along the back of the driver and have first end which connects to the driver's helmet by use of hooks and tethers, and second ends which extends between the driver's legs for connection to a seat belt assembly. A chest strap and a waist strap are attached to the anchor straps for keeping the anchor straps separated at a predetermined distance. When exiting the vehicle, the driver unlatches a standard vehicle seat belt assembly and the restraint device is simultaneously released from the vehicle. Since the restraint is neither rigid nor bulky, the driver can quickly exit the vehicle unrestricted by the device.

23 Claims, 6 Drawing Sheets

*Fig.4* *Fig.5*
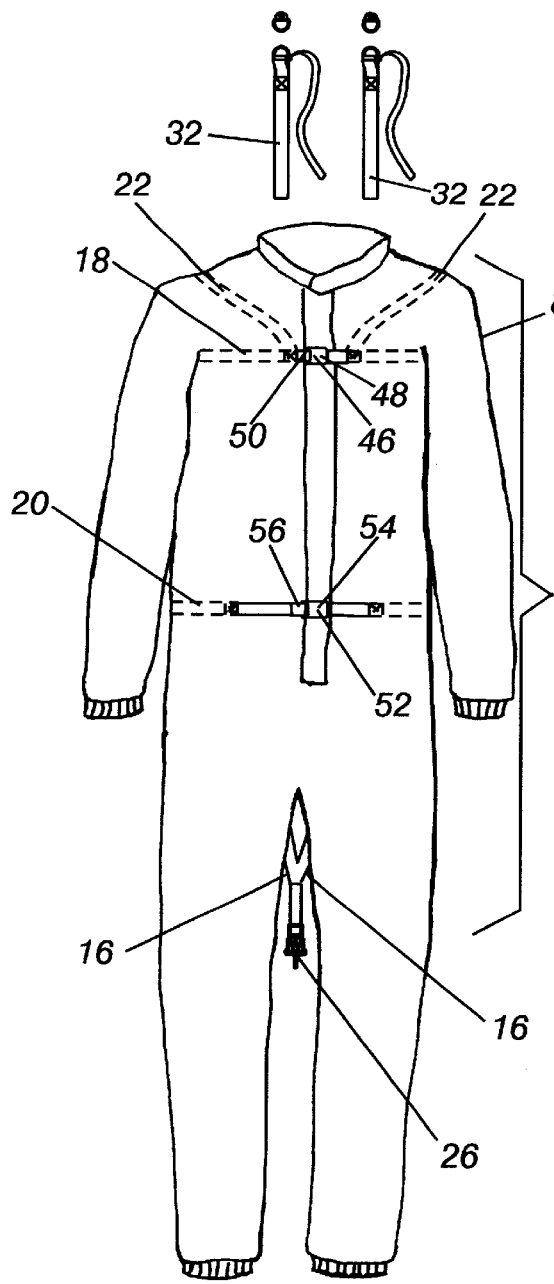
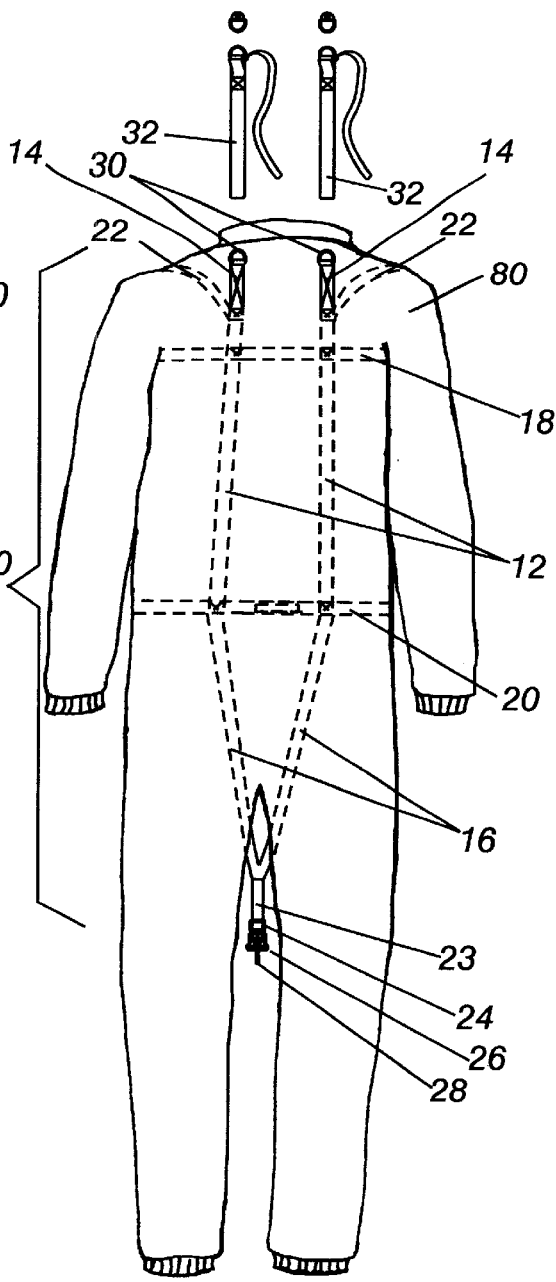

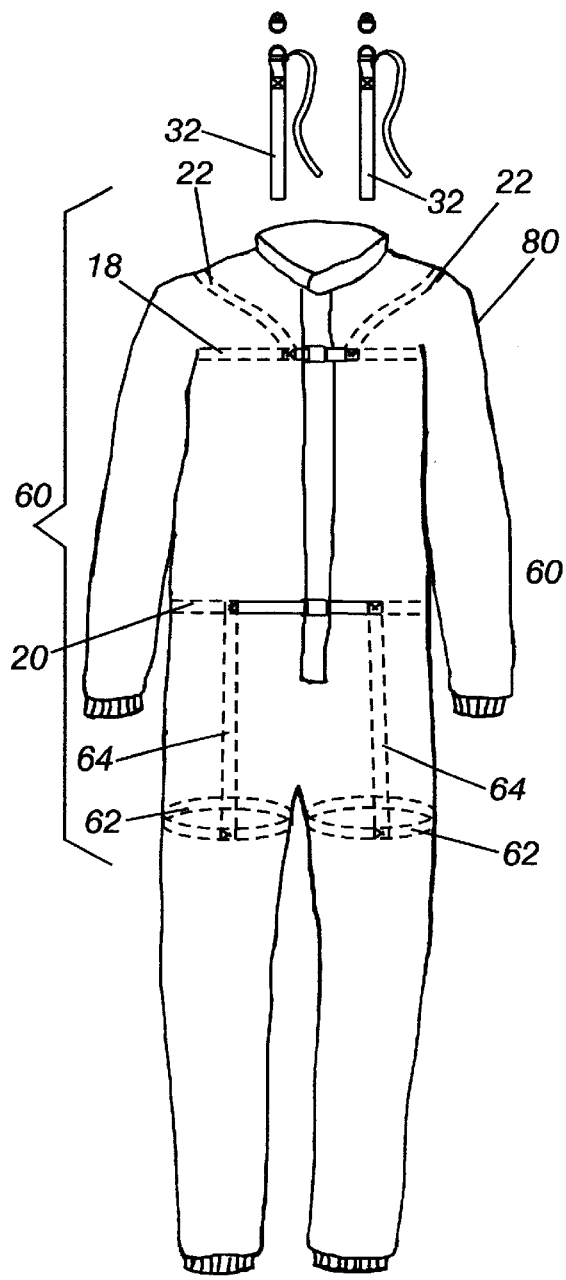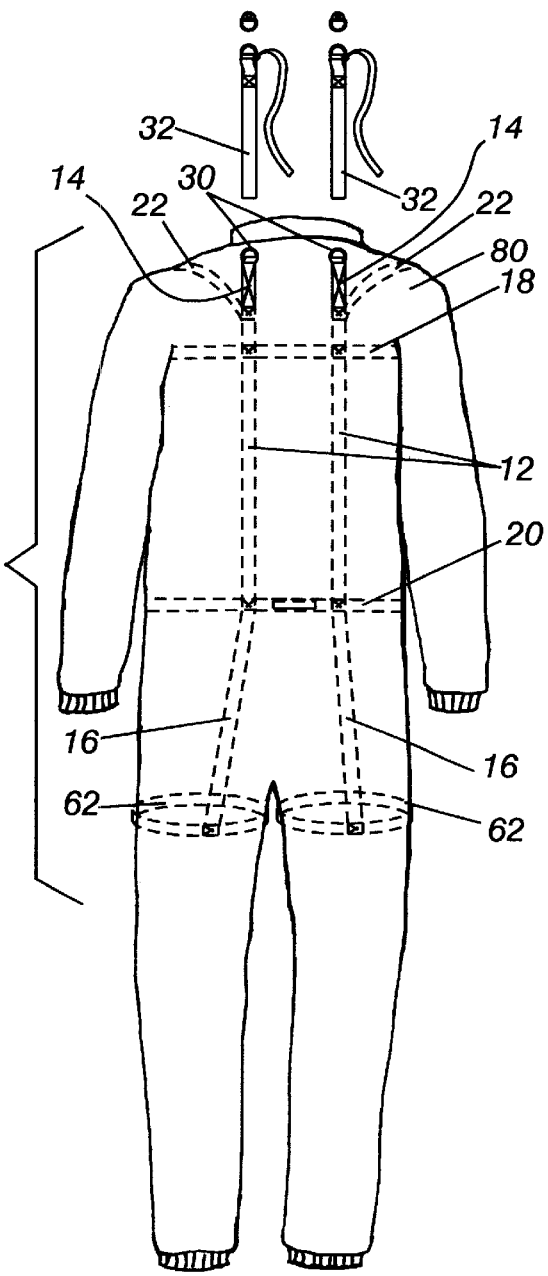

RACE CAR DRIVER HELMET/HEAD RESTRAINT

CROSS REFERENCE TO RELATED APPLICATION

This application is a Continuation-In-Part of U.S. Utility Patent Application Filed Apr. 19, 2001, Ser. No. 09/837,215 now abandoned.

BACKGROUND OF THE INVENTION

The present invention relates to a method and apparatus for controlling a driver's head and neck when subject to deceleration forces, and more particularly, to a device for controlling the forward and downward movement of the head and neck of a driver during a frontal crash of a high performance vehicle.

1. Field of the Invention

Currently, drivers of high performance vehicles use a standard five or six point seat belt assembly in which all the straps tie into a common buckle to restrain the driver during a crash. However, these seat belts do not restrain the driver's head or neck, allowing the head to uncontrollably snap forward when the vehicle is subject to a frontal impact. This uncontrolled movement of the head has resulted in serious injury and death.

Recent efforts to improve safety for high performance vehicle drivers include devices designed to restrain the head and neck of the driver during a frontal crash. One such device is the "Hanns Device", described in U.S. Pat. No. 6,009,566 to Hubbard, which includes a rigid yoke worn by the driver to which a safety helmet is tethered.

Unfortunately, because of the rigid bulky yoke, the Hanns Device itself may be a safety hazard by impeding the driver from exiting the vehicle during an emergency situation. With high performance vehicles, egress into and out of the vehicle is through the driver-side window frame. When a vehicle crash occurs it is important that the driver quickly escape from the vehicle. This need to quickly exit the vehicle is particularly critical when the driver and/or vehicle is on fire or the driver is seriously injured. However, since the yoke is stiff and bulky, the Hanns Device can impede the driver from exiting the vehicle by making it more difficult to fit through the driver-side window frame. Consequently, valuable time in removing the driver from a dangerous crash site and to treat the driver may be lost.

Another disadvantage of the Hanns Device is that the driver's seat must be modified to accommodate the bulky yoke. Accordingly, additional expense is incurred and the device cannot be used in vehicles which have not been modified.

A further disadvantage of the Hanns Device is that the rigid bulky yoke is uncomfortable to some drivers and unnecessarily restricts their mobility when operating the vehicle.

Other head and neck restraints do not have a positive anchor into which forces from the head and neck can be transferred. Instead, they are mounted to a transient object, such as the driver's clothing or to a chest or waist strap. Accordingly, these types of devices do not provide the needed restraint during impact.

What is needed is a device which restrains a driver's head and neck during a frontal crash with a vehicle. Additionally, needed is for the device to be comfortable and to not impede the driver's egress into and out of the vehicle.

2. Description of the Prior Art

The applicant is aware of the following U.S. Patents concerning a race car helmet restraint:

| U. S. Pat. No. | Inventor | Issue Date | Title |
| --- | --- | --- | --- |
| 4,909,459 | Patterson | 03-20-1990 | HELMET-MOUNTED HEAD RESTRAINT |
| 4,923,147 | Adams | 05-08-1990 | HEAD SUPPORT/SPINE OFFLOADING EJECTION SEAT INSERT |
| 5,267,708 | Monson | 12-07-1993 | HEAD SUPPORT APPARATUS |
| 5,272,770 | Allen | 12-28-1993 | HEAD RESTRAINING SYSTEM |
| 5,715,541 | Landau | 02-10-1998 | BRAIN AND SPINAL CORD PROTECTOR |
| 6,009,566 | Hubbard | 01-04-2000 | HEAD AND NECK SUPPORT FOR RACING |

Patterson describes a head restraint device which connects the helmet of an occupant to a vehicle seat. The head restraint has a restraining strap which applies a single force to the head to restrain the head from horizontal forward motion and a strap assembly on the helmet to hold the head upright. The restraining strap pulls the head directly back near the middle of the head and helmet. The restraining strap only applies the force when the deceleration forces are above a predetermined level. The attachment of the strap to the helmet allows the helmet to rotate about a vertical axis approximately 180 degree. The restraint can also be connected to the torso of the occupant to simultaneously retract the head and the torso. The restraint must be detached for the occupant to exit the vehicle.

Adams et al. describes a seat insert for a vehicle which maintains an occupant of the vehicle in a forward position during high G acceleration. The seat insert has a head support member for supporting the occupant's head during a forward, leaning posture. A head support member restraint cord is provided to restrain the movement of the head support member during the occupant's forward lean. The top and bottom of the helmet are restrained to the head support member which is behind and above the top of the helmet. The head support member tends to resist motions of the occupant's head which are downward due to accelerations. The seat insert also includes a back plate assembly connected to the head support member for supporting the spine in its natural curvature. The back plate assembly is able to pivot forward relative to the seat of the vehicle. The seat insert is able to transfer G-induced weight from the spine to the back plate assembly and ultimately to the existing seat of the vehicle. The seat insert restrains the driver relative to the seat and must rely on restraint of the torso to be compatible with the head restraint for restraining the head relative to the torso.

Monson et al. describes a head support apparatus which can be attached to a body support device. The apparatus includes a beam housing attachable to the body support device such as to be rigid in the y-z plane but to be rotatable about a x-axis. The x-axis is defined as extending through the subject's face to the back of the head. The y-axis is defined as extending laterally from ear to ear and the z-axis is defined as extending vertically from the top of the head through the subject's chin. A U-shaped rigid beam is mountable in a channel of the beam housing such that the beam is rigidly supported within the x-y plane but is able to be rotated about the x-axis. Helmet attachments are provided for supporting the helmet relative to the rigid beam within the x-z plane but allowing rotation of the helmet about the y-axis.

Allan describes a head restraining system including a helmet having a chin protector formed thereon, a keeper plate overlying the shoulders, upper chest, including the sternum area, and upper back of the driver, a plurality of straps connecting the shoulder, chest and back portion of the keeper plate to aligned portions of the helmet and a pair of shoulder straps securing the keeper plate to the driver.

Landau describes a brain and spinal cord protector which is provided to protect the brain and spinal cord of a user against a fall. The protector comprises a jacket which is worn about the user's torso, a head shield shaped to cover the user's head, a support extending from the jacket to the head shield to position the head shield above the jacket so that the inner surface of the head shield is spaced from the user's head.

Hubbard describes the head and neck restraint device for occupants of high performance vehicles. The support device includes a restraining yoke and a collar. The restraining yoke has two front portions which extend out from the shoulders of the driver along the torso of the occupant, and also include a rear portion which extends behind the neck and shoulders of the occupant. The collar of the device extends upwards from the rear portion of the restraining yoke behind the head of the occupant. The collar of the device is connected by tethers to the helmet worn by the occupant. Shoulder belts of the shoulder harness provided in the vehicle extend over the front portion and rear portion of the restraining yoke when the device is mounted on the occupant such that the device is between shoulder belt and the occupant. The collar acts to transfer forces from the helmet through the tethers to the collar of the restraining yoke which transfers the forces to the shoulder harness thereby reducing the forces being transmitted to the neck of the occupant.

SUMMARY OF THE INVENTION

The invention provides a method and apparatus for controlling a driver's head and neck during a frontal crash of a high performance vehicle. The device connects the driver's helmet to the vehicle seat belt assembly to transfer forces from the helmet, through the device, to the seat belt assembly. During normal operation, the device is worn on the driver and does not impede the driver's mobility while operating the vehicle or while entering or exiting the vehicle. During an impact, the harness device keeps the driver's head and neck in alignment with the driver's spine to keep the head from snapping forward.

In the broadest sense, the present invention relates to a restraint device controlling the head and neck of the driver during a frontal crash of a vehicle. The restraint device includes at least one anchor strap having a first end positionable along the back of the driver and a second end positionable between the legs of the driver. A first attachment means is attached to the first end of the anchor straps for releasably attaching to a helmet. A second attachment means is attach to the second end of the anchor strap for releasably attaching to a seat belt assembly. When the vehicle is subjected to a frontal impact, the anchor strap is placed in tension and restrains the head and neck of the wearer for snapping forward. Optionally, the anchor straps can be adjustable to accommodate different wearers. Additionally, the anchor strap can be generally Y-shaped such that it has two first ends and one second end. A chest strap can be also attached to the first end of anchor strap, and have adjustment means attach to the chest strap for adjusting the effective length of the chest strap to accommodate different drivers. In a further option, the anchor strap can be fixed to a racing suit.

Also in the broadest sense, the present invention relates to a restraint device for controlling the head and neck of a driver during a frontal crash of the vehicle. The restraint device includes a first anchor strap having a first end positionable along the back of the driver and having a second end. A second anchor strap is laterally disposed from the front anchor strap and has a first end positionable along the back of the driver and a second end. A first attachment means is attach to the first end of the first anchor strap for releasably attaching to a helmet. A second attachment means is attach to the first end of the second anchor strap for releasably attaching to the helmet. A first leg strap extends from the second end of the first anchor strap and is configured to encircle a portion of the driver's leg when the device is worn by the driver. A second leg strap extends from the second end of the second anchor strap and is configured to encircled a portion of the driver's other leg. The head and neck of the driver is restrained from snapping forward when the vehicle is subjected to a frontal impact by the first and second anchor straps going into tension. Optionally, the restraint device can also include a chest strap attached to the first ends of the first and second anchor straps and have means attached to the chest strap for adjusting the length of the chest strap to accommodate different drivers. As a further option, the first and second anchor straps can be incorporated into, and fixed to, a racing suit.

OBJECTS OF THE INVENTION

The principal object of the present invention is to provide a device for controlling a driver's head and neck during a frontal crash of a high performance vehicle.

Another object of the invention is to provide a device which is carried on the driver.

A further object of the invention is to provide a device which is not bulky.

Another object of the invention is to provide a device which is not rigid.

A further object of the invention is to provide device which is comfortable to wear.

Another object of the invention is to provide a device which does not impede egress into or out of a vehicle.

Another object of the invention is to provide a device which releasable attaches to a high performance vehicle seat belt assembly and to a safety helmet.

A further object of the invention is to provide a device which maintains the head and neck of the driver in alignment with the driver's spine during a frontal impact of a high performance vehicle.

Another object of the invention is to provide a device which transfers forces from a driver's helmet to a vehicle's seat belt assembly during a frontal impact of the vehicle.

BRIEF DESCRIPTION OF THE DRAWINGS

The foregoing and other objects will become more readily apparent by referring to the following detailed description and the appended drawings in which:

FIG. 4 is a front view of the restraint device of FIG. 2 attached to a racing suit;

FIG. 5 is a rear view of the restraint device of FIG. 2 attached to a racing suit;

FIG. 8 is a front view of the restraint device of FIG. 3 attached to a racing suit; and FIG. 9 is a rear view of the restraint device of FIG. 3 attached to a racing suit.

DESCRIPTION OF THE PREFERRED EMBODIMENTS

The invention is a device for restraining and controlling a driver's head and neck during a frontal crash of a high performance vehicle. The restraint device accomplishes this task by connecting the driver's helmet to a standard five or six point seat belt assembly which serves as a hard point between the device and the vehicle. During normal operation, the device does not impede the driver's mobility while operating the vehicle, or while entering or exiting the vehicle. During an impact, the device transfers forces from the helmet, through the device, to the seat belt assembly to keep the head and neck in alignment with the spine and to keep the driver's head from snapping forward.

Figure 1:
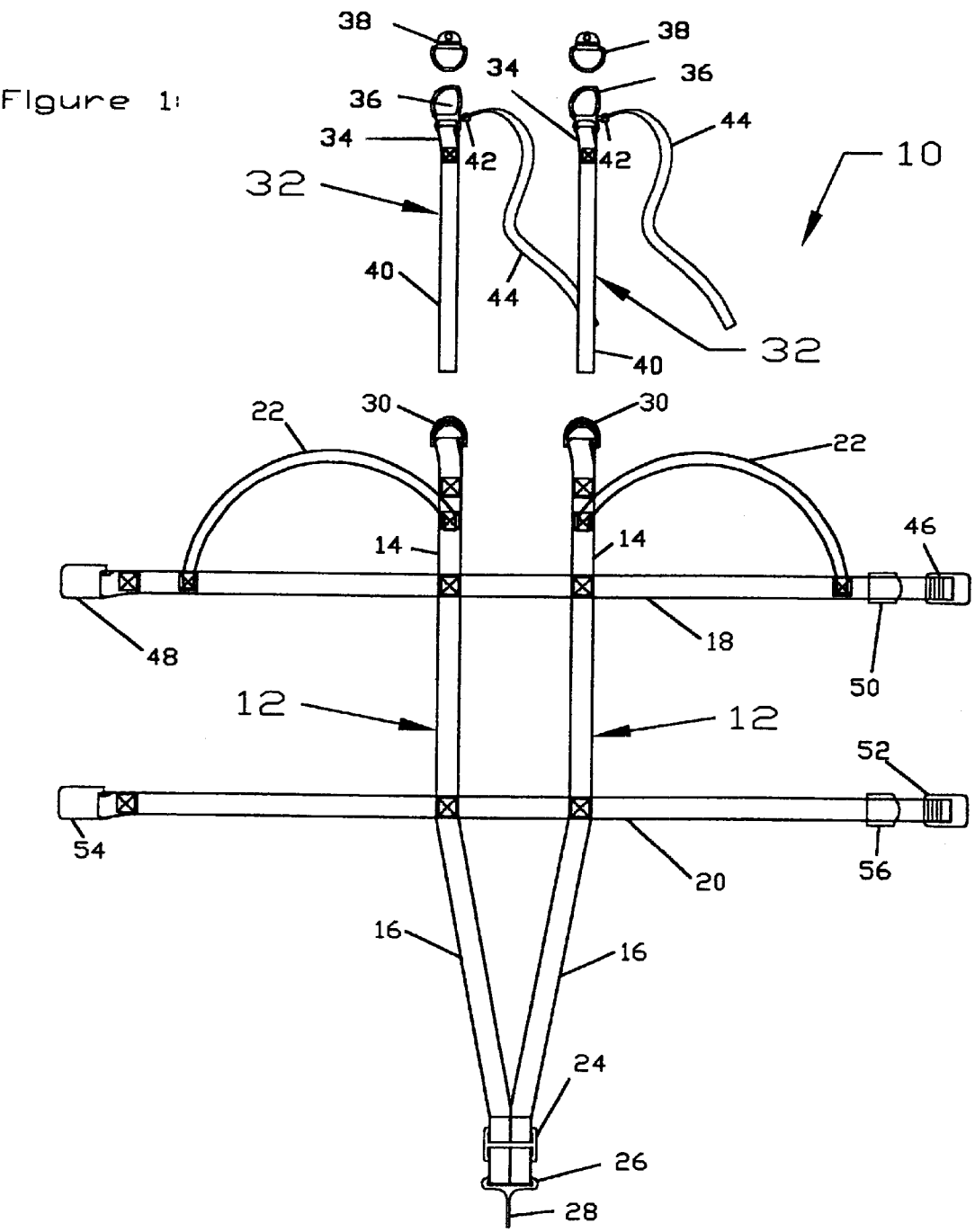
FIG. 1 is a front view of a head and neck device according to the preferred embodiment of the invention.
Figure 2:
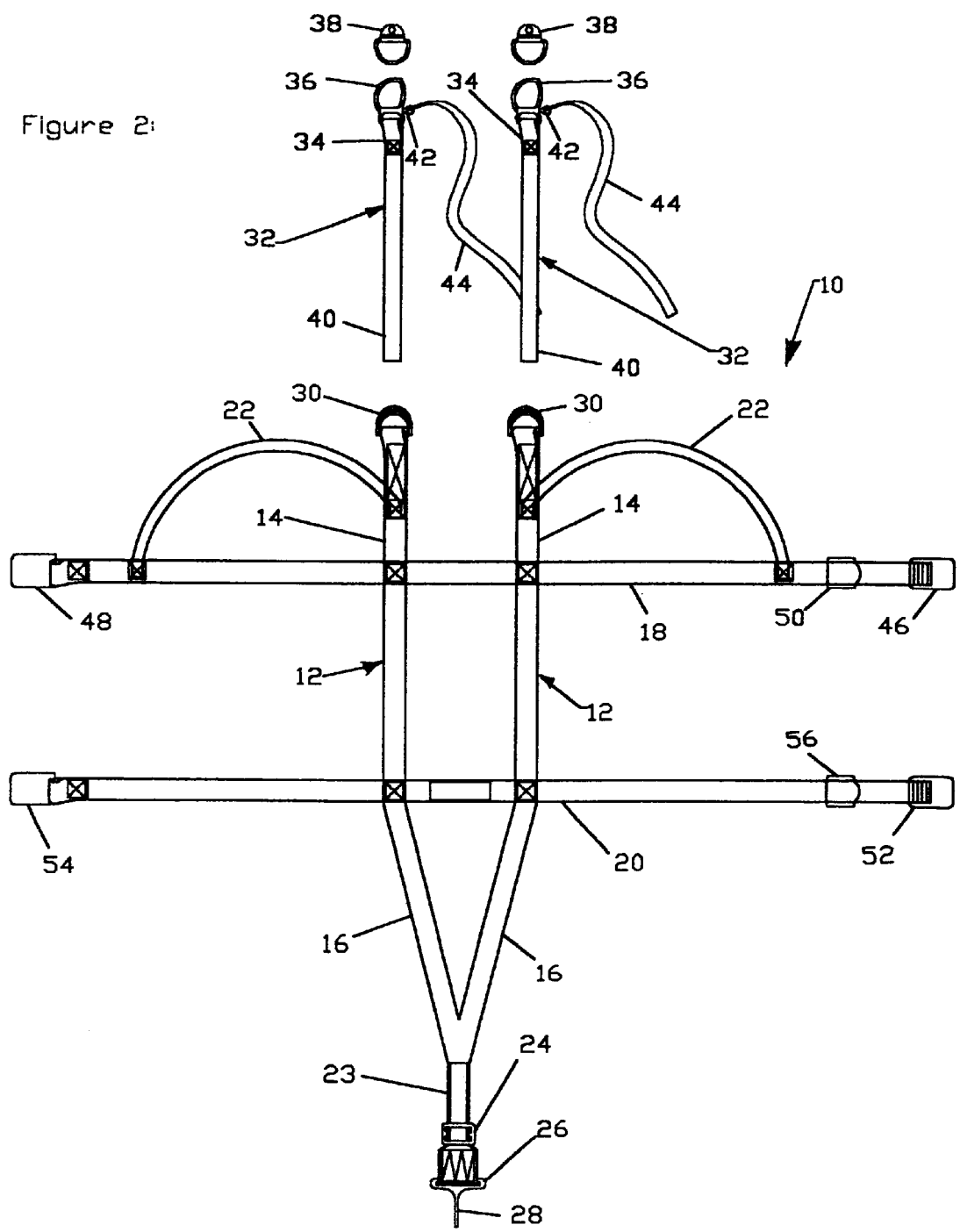
FIG. 2 is a front view of the restraint device of FIG. 1, but having a single strap provided with an attachment means for releasably connecting the device to a seat belt assembly.

Referring now to the drawings, in particularly to FIGS. 1 and 2, the restraint device 10 is comprised of a plurality of interconnected straps which are worn by the driver. The straps include a pair anchor straps positional along the back of the driver and having a first end 14 for releasably attaching to a helmet (not shown) and a second end 16 for releasably attaching to the seat belt assembly (not shown); chest and waist straps 18, 20 respectively disposed horizontally about the upper torso and lower torso of the driver; and a pair of shoulder straps 22 for maintaining the device 10 in position on the driver. The straps can be made of any suitable materials such as nylon webbing, polyester, and cotton. Although the straps can be made with different widths, preferably the anchor straps 12, chest strap 18 and waist strap 20 are each 1 inch (2.54 cm) wide.

When worn, the anchor straps 12 extend along the driver's back with the first ends 14 terminating at or about shoulder height and the second end 16 wrapped forwardly between the driver's legs for attachment to the seat belt assembly. The first ends 14 of the anchor straps 12 are generally parallel and spaced apart a distance approximately equivalent to the width of a racing helmet. The second ends 16 of the anchor straps 16 converge towards each other where they may combined into a single strap 23, as shown in FIG. 2, or remain as two separate straps, as shown in FIG. 1. A webbing slide adjuster 24 is provided at the second ends 14 of the anchor straps 12 to provide height adjustment of the device to accommodate different drivers.

The free terminus of the second end 16 of each anchor strap 12 attaches to a seat belt anchor 26 having a tongue 28 for releasably attaching to the five or six point seat belt assembly typical of high performance vehicle. Accordingly, the device 10 is attached to a "hard point" into which forces applied to the device 10 are transferred.

The free terminus of the first end 14 of each anchor strap 12 is provided with a D-ring 30 for attachment to a complementary helmet tether 32 which attaches the helmet to the anchor strap 12. Each helmet tether 32 has an upper end 34 having a quick release helmet hook 36 for releasably attaching to a D-ring helmet clip 38, and an opposing lower end 40 adjustably attachable to the anchor strap D-ring 30. Each quick release helmet hook 36 is provided with a latch 42 to which a quick release tether 44 is attached to provide a quick and simple means for detaching the device 10 from the helmet.

In an alternative embodiment (not shown), the anchor straps 12 can be lengthened to directly attached to the helmet. In this alternative, the D-rings 30 provided on the anchor straps 12 are replaced by quick release helmet hooks for releasably attaching the anchor straps 12 to the D-ring helmet clips 38. A webbing slide adjuster is provided on the first ends of the anchor straps 12 to adjust the anchor straps 12 to the helmet to accommodate drivers of different heights.

Referring to FIGS. 1 and 2, the D-ring helmet hooks 38 are provided on opposed side of the helmet shell so that the helmet tethers and first ends 14 of anchor straps 12 run generally vertically downward from, and parallel to, the sides of the helmet. This predetermined spacing of the first ends 14 of the anchor straps 12, and the second ends 16 of the anchor straps 12 tying into the seat belt assembly, reduces the magnitude of torsion forces applied to the driver's neck during a crash by generally equally loading the anchor straps 12 on each side of driver's head. Accordingly, the anchor straps 12 tend to maintain the driver's head in a forward facing position and control the driver's head from snapping forward.

The chest strap 18 is generally horizontally disposed and is secured perpendicular to the first ends 14 of the anchor straps 12 by sewing or the like. The anchor straps 12 are separated along the chest strap 18 by the predetermined distance which is approximately equal to the outer width of the helmet shell. When the anchor straps 12 are placed in tension, the chest strap 18 maintains the spacing between the anchor straps 12 at the predetermined distance.

The chest strap 18 is provided with a buckle 46 at one end and complementary tongue 48 at the opposed end so that the chest strap 18 can be releasably fastened together once disposed about the driver. The chest strap 18 is also provided with a webbing tie 50 for length adjustment of the chest strap 18 so that the device 10 can be tightened against the driver and can be worn by drivers of different girth.

The waist strap 20 is generally horizontally disposed beneath the chest strap 18 and is secured perpendicular to the anchor straps 12 by sewing or the like. The anchor straps 12 are separated along the waist strap 20 by the predetermined distance. When the anchor straps 12 are placed in tension, the waist strap 20 maintains the spacing between the anchor straps 12. The waist strap 20 is provided with a buckle 52 at one end and a complementary tongue 54 at the opposed end so that the waist strap 20 can be releasably fastened together once its disposed about the driver. The waist strap 20 is provided with a webbing tie 56 for length adjustment so that the device can be tightened against the driver and can accommodate different drivers.

The pair of shoulder straps 22 extend from the anchor straps 12 to the chest strap 18 and are attached to these straps 12, 18 by sewing or the like. The shoulder straps 22 have a sufficient length to define a suitable space through which the driver's arms and shoulders can be received. The shoulder straps 22 do not perform a safety function, but instead assist in holding the device 10 in position on the driver when the device 10 is not connected to the driver's helmet, particularly when the driver is in a standing position, such as before entering or after exiting the vehicle.

Figure 3:
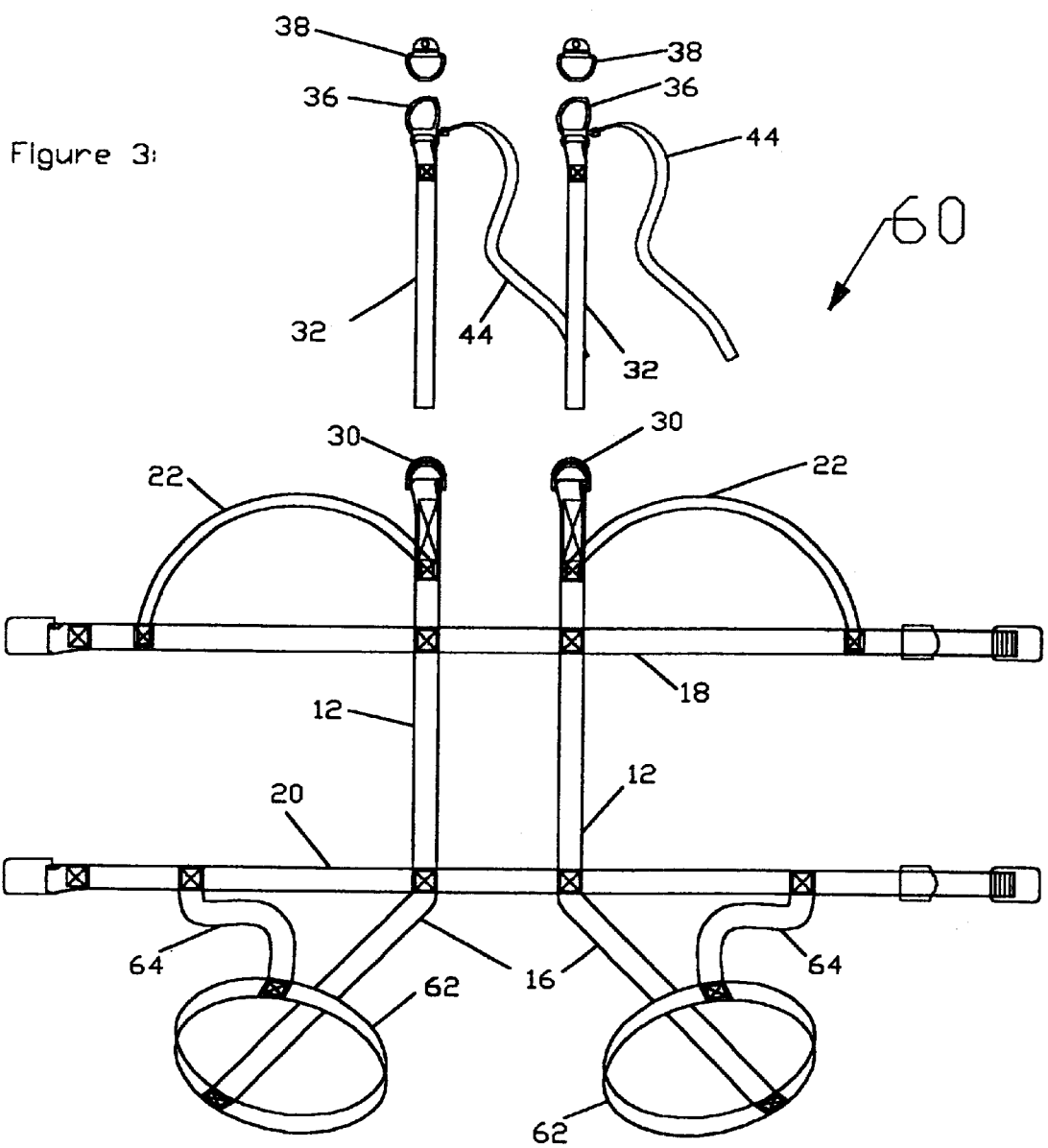
FIG. 3 is a front view of an alternative head and neck restraint device having leg attachment straps.
Figure 6:
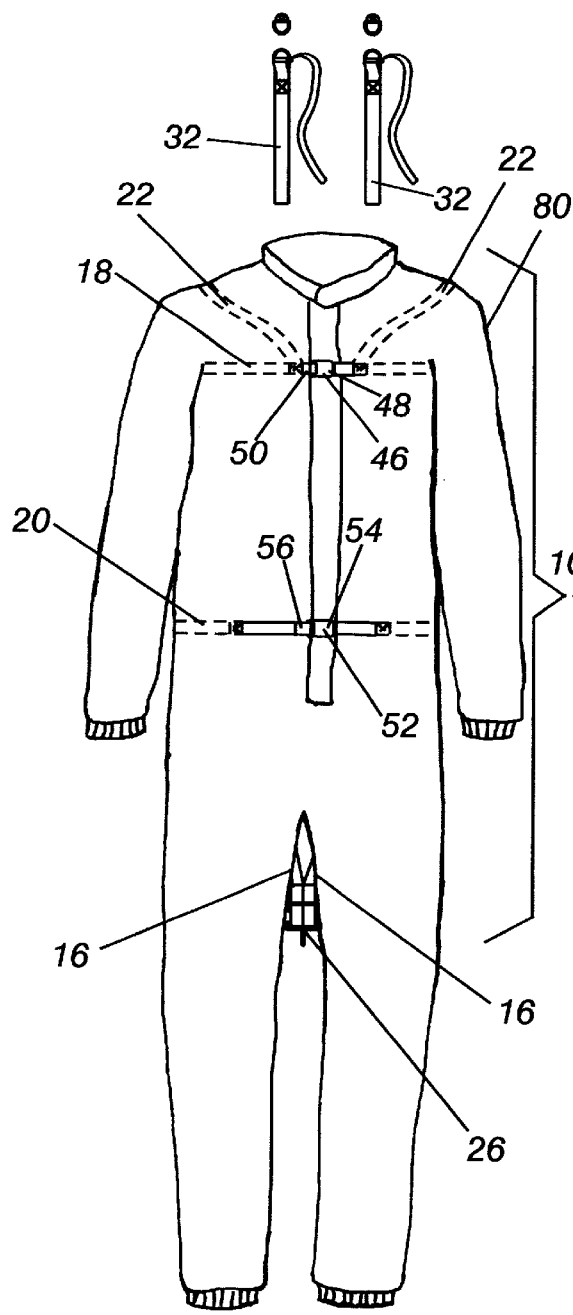
FIG. 6 is a front view of the restraint device of FIG. 1 attached to a racing suit.
Figure 7:
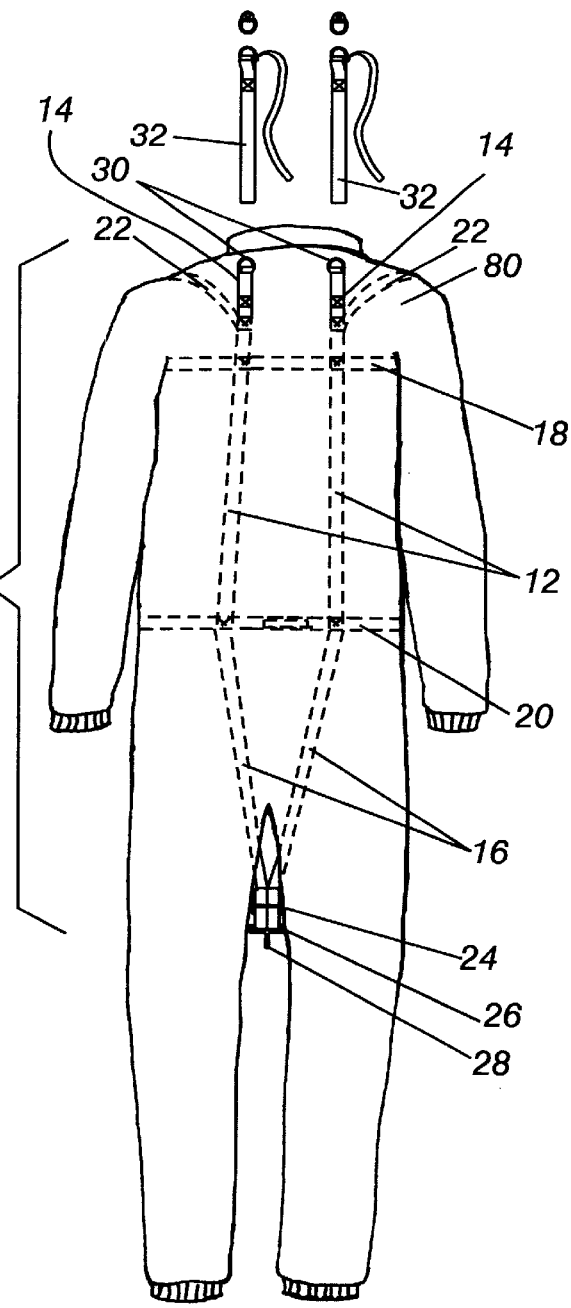
FIG. 7 is a rear view of the restraint device of FIG. 1 attached to a racing suit.

An alternative embodiment of the restraint device 60 is shown in FIG. 3. The device 60 is as described above, and similarly numbered, except that the second ends 16 of the anchor straps 12 are attachable to the driver's legs instead of seat belt assembly. In the alternative embodiment, leg straps 62 are provided at the free terminus of the second end 16 of the anchor straps 12. The driver's legs are inserted through the leg straps 62 which snugly fit around the driver's upper thigh. The mass of the driver's legs anchors the device 10 against decelerations forces applied to the driver's head and neck. A secondary strap 64 can also be provided which attaches the leg straps 62 to the waist strap 20. Additionally, a suitable adjustment means (not shown), such as a webbing tie, can be provided to tighten or loosen the leg straps so that a snug fit is universally achieved about the driver's upper thighs.

Any of the previously described embodiments can be made integral with a driver's racing suit to make getting into and out of the device easier. For example, the restraint devices 10, 60 shown in FIGS. 1–3 can be attached to the racing suit 80 as illustrated in FIGS. 4–9. Suitable means can be used integrate the restraint device 10, 60 into the suit such as, for example, sewing the device thereto. In such a case, the shoulder straps 22 would be optional as a suit would carry the restraint device. Moreover, the chest and waist straps 18, 20 would be optional since spacing of the anchor straps 12 would be achieved by sewing the anchor straps 12 into the suit at the predetermined distance.

Referring to FIGS. 4–7, to attach the integrated device 10 to the helmet and seat belt assembly, the first ends 14 of the anchor straps 12 exit from a shoulder portion of the racing suit 80 for attachment to the helmet tethers 32 or to the helmet. Likewise, the free terminus of the second ends 16 of the anchor straps 12 extend from the racing suit between the legs of the driver, to expose the seat belt anchors 26 for attachment to the seat belt assembly.

Referring to FIGS. 8–9, to attach the integrated device 60 to the helmet, the first ends 14 of the anchor straps 12 exit from a shoulder portion of the racing suit 80 for attachment to the helmet tethers 32 or to the helmet. The drivers' legs are inserted through the leg straps 62 which snugly fit around the driver's upper thighs. Optionally, a secondary strap 64 can be provided which attaches the leg straps 62 to the waist strap 20. Additionally, a suitable adjustment means, such as a webbing tie can be provided to tighten and loosen the leg straps so that a snug fit is achieved about the driver's upper thigh.

Referring to FIGS. 1 and 2, in a event of a frontal or angular frontal impact to the vehicle, the anchor straps 12 are placed in tension loaded by the driver's head and body forward travel. Under tension, the anchor straps 12 pull against the driver's head and neck forward travel to keep general alignment with the spine. Accordingly, the driver's head is restrained from snapping forward. Moreover, since the tethers 32 and first ends 14 of the anchor straps 12 extend vertically downward from the sides of the helmet, and are separated the predetermined distance by the chest and waist straps 18, 20, the device 10 limits torsion to the driver's neck.

The restraint device 60 illustrated in FIG. 3 functions as previously described except the amount of tension the anchor straps 12 can be place in is limited by the resisting force of the driver's legs instead of the seat belt assembly 2. Consequently, under certain circumstances, the anchor straps 12 could pull up the legs of the driver thereby allowing the driver's head to move forward a greater amount than if the device 60 was secured to the seat belt assembly.

If the driver is involved in a crash, the restraint device 10 is advantageously not permanently mounted to the vehicle. Hence, to exit the vehicle, the driver simply unlatches the seat belt assembly and the restraint device 10 is simultaneously released from the seat belt assembly. Since the device 10 moves with the driver and is neither bulky nor rigid, the driver can quickly exit the vehicle unrestricted by the device 10.

SUMMARY OF THE ACHIEVEMENT OF THE OBJECTS OF THE INVENTION

From the foregoing, is readily apparent that I have invented a race car driver head and neck restraint device which is worn by a driver while operating a high performance vehicle. The device maintains the driver's head and neck in general alignment with the driver's spine in the event of frontal crash by the vehicle. The restraint device is carried on the driver and is releasably attachable at one end to a safety helmet and that the other end to a standard seat belt assembly of vehicle. The restraint device is neither bulky nor rigid and therefore does not impede egress into and out of the vehicle.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A restraint device for controlling the head and neck of a wearer during a frontal crash of a vehicle comprising:
   at least one anchor strap having a first end positionable along the back of the wearer and a second end positionable between the legs of the wearer;
   a first attachment means attached to said first end of said anchor strap for, directly or indirectly, releasably attaching to a helmet;
   a second attachment means attached to said second end of said anchor strap for, directly or indirectly, releasably attaching to a seat belt assembly; and
   wherein said anchor strap is placed in tension when the vehicle is subjected to a frontal impact whereby the head and neck of the wearer is restrained from snapping forward by said anchor strap.

2. The restraint device in accordance with claim 1 further comprising means attached to said anchor strap for adjusting the effective length of said anchor strap.

3. The restraint device in accordance with claim 2 wherein said first attachment means is a quick release device.

4. The restraint device in accordance with claim 2 wherein said second attachment means is a quick release device.

5. The restraint device in accordance with claim 4 wherein said second attachment means is a seat belt anchor.

6. The restraint device in accordance with claim 2 wherein said anchor strap length adjustment means is attached to the second end of said anchor strap.

7. The restraint device in accordance with claim 6 wherein said anchor strap is at least two anchor straps.

8. The restraint device in accordance with claim 6 further comprising a chest strap attached to the first end of said anchor strap, and means attached to said chest strap for adjusting the effective length of said chest strap, wherein said chest strap is releasably attachable around the chest of the wearer.

9. The restraint device in accordance with claim 6 wherein said anchor strap is generally Y-shaped having two first ends and one second end, and further including a chest strap attached to the first ends of said anchor strap and means attached to said chest strap for adjusting the effective length of said chest strap, wherein said chest strap is releasably attachable around the chest of the wearer.

10. The restraint device in accordance with claim 9 wherein said first ends of said anchor strap are attached to said chest strap in a range of about 7 (2.75 cm) inches to about 14 inches (5.5 cm) apart.

11. The restraint device in accordance with claim 9 further comprising a waist strap attached to the first ends of said anchor strap and means attached to said waist strap for adjusting the effective length of the waist strap, wherein said waist strap is releasably attachable around the waist of the wearer.

12. The restraint device in accordance with claim 11 further comprising a pair of shoulder straps wherein each of said shoulder straps has a first end attached to said anchor strap and a second end attached to said chest strap.

13. The restraint device in accordance with claim 1 further comprising a racing suit wherein said anchor strap is fixed to said racing suit.

14. The restraint device in accordance with claim 13 wherein said anchor strap is fixed to said racing suit by stitching.

15. A restraint device for controlling the head and neck of a wearer during a frontal crash of a vehicle comprising:

a first anchor strap having a first end positionable along the back of the wearer and a second end;

a second anchor strap, laterally disposed from said first anchor strap when worn by the wearer, having a first end positionable along the back of the wearer and a second end;

a first attachment means attached to the first end of said first anchor strap for, directly or indirectly, releasably attaching to a helmet;

a second attachment means attached to the first end of said second anchor strap for, directly or indirectly, releasably attaching to the helmet;

a first leg strap extending from the second end of said first anchor strap wherein said first leg strap is capable of encircling a portion of the wearer's leg when worn by the wearer;

a second leg strap extending from the second end of said second anchor strap wherein said second leg strap is capable of encircling a portion of the wearer's leg when worn by the wearer; and wherein said first and second anchor straps are placed in tension when the vehicle is subjected to a frontal impact whereby the head and neck of the wearer is restrained from snapping forward by said first and second anchor straps.

16. The restraint device in accordance with claim 15 further comprising a first adjustment means attached to said first anchor strap for adjusting the effective length of said first anchor strap and a second adjustment means attached to said second anchor strap for adjusting the effective length of said second anchor strap.

17. The restraint device in accordance with claim 16 wherein said first and second anchor strap length adjustment means are quick release devices.

18. The restraint device in accordance with claim 17 further comprising a chest strap attached to the first end of said first anchor strap and to the first end of said second anchor strap, and means attached to said chest strap for adjusting the effective length of said chest strap, wherein said chest strap is releasably attachable around the chest of the wearer.

19. The restraint device in accordance with claim 18 further comprising a waist strap attached to the first end of said first anchor strap and to the first end of said second anchor strap, and means attached to said waist strap for adjusting the effective length of the waist strap, wherein said waist strap is releasably attachable around the waist of the wearer.

20. The restraint device in accordance with claim 17 further comprising a racing suit wherein said first and second anchor straps are fixed to said racing suit.

21. A restraint device for controlling the head and neck of a wearer during a frontal crash of vehicle comprising:

at least one anchor strap having a first end positionable along the back of the wearer and a second end;

an attachment means attached to the first end of said at least one anchor strap for, directly or indirectly, releasably attaching to a helmet;

a first leg strap extending from the second end of said at least one anchor strap wherein said first leg strap is capable of encircling a portion of the wearer's leg when worn by the wearer;

a second leg strap extending from the second end of said at least one anchor strap wherein said second leg strap is capable of encircling a portion of the wearer's leg when worn by the wearer; and wherein said at least one anchor strap is placed in tension when the vehicle is subjected to a frontal impact whereby the head and neck of the wearer is restrained from snapping forward by said at least one anchor strap.

22. A head and neck restraint device for restraining a wearer during a vehicle impact comprising:

at least one strap extendable along the back of the wearer;
a first means for attaching said strap to a helmet; and
a second means for attaching said strap to a seat belt assembly.

23. The restraint device in accordance with claim 1 wherein said strap is adjustable.

* * * * *